(12) United States Patent
Lide

(10) Patent No.: US 6,181,716 B1
(45) Date of Patent: Jan. 30, 2001

(54) SYNCHRONIZATION OF VOICE PACKET GENERATION TO UNSOLICITED GRANTS IN A DOCSIS CABLE MODEM VOICE OVER PACKET TELEPHONE

(75) Inventor: David Lide, Rockville, MD (US)

(73) Assignee: Telogy Networks, Inc., Germantown, MD (US)

( * ) Notice: Under 35 U.S.C. 154(b), the term of this patent shall be extended for 0 days.

(21) Appl. No.: 09/449,674

(22) Filed: Nov. 30, 1999

(51) Int. Cl.[7] ....................................................... H04J 3/06

(52) U.S. Cl. ............................ 370/519; 370/503; 370/508

(58) Field of Search ................................... 370/503, 506, 370/507, 508, 516, 519

(56) References Cited

U.S. PATENT DOCUMENTS 6,064,652 * 5/2000 Buckland et al. .................... 370/235

* cited by examiner

*Primary Examiner*—Joseph L. Felber
(74) *Attorney, Agent, or Firm*—Levy & Grandinetti

(57) ABSTRACT

Packet production by a digital signal processor (DSP) is synchronized with modem transmission opportunities in a cable network. The cable modem computes the average waiting time a packet spends waiting to be transmitted by the modem. The DSP re-syncs transfer of packets to the modem by using this average waiting time minus a small amount sufficient to account for the maximum anticipated propagation delay, as the amount to delay the transmission of its next packet to the cable modem. This invention is a mechanism for re-synchronization that is largely independent of any propagation delays inherent in the hardware architecture.

9 Claims, 4 Drawing Sheets

| Channel | Message Type | Shift Amount |
|---|---|---|

FIG. 3

SYNCHRONIZATION OF VOICE PACKET GENERATION TO UNSOLICITED GRANTS IN A DOCSIS CABLE MODEM VOICE OVER PACKET TELEPHONE

BACKGROUND OF THE INVENTION

The present invention relates to cable modems. More specifically, the present invention relates to voice transmission over cable modems. The Data Over Cable Systems Interface Specification (DOCSIS) describes a standard for the cable modem interface between a cable TV operator and a computer. DOCSIS has been accepted as the standard for devices that handle incoming and outgoing data signals across this interface since DOCSIS 1.0 was ratified by the International Telecommunication Union (ITU) in March of 1998. Cable modems conforming to DOCSIS are available in many areas where cable operators operate.

The DOCSIS 1.1 specification provides for Unsolicited Grant service as one of several data transmission mechanisms for grabbing bandwidth for packets. This service is set up ahead of time between a cable modem and head-end equipment (CMTS), and is parameterized by the desired data packet arrival rate, packet size, and jitter tolerance. Once set up, the cable network head-end equipment will give unsolicited transmission opportunities (grants) to the cable modem at the requested rate. This service provides an efficient mechanism for transporting voice packets but does not provide for maximizing voice quality.

Unlike callers in a circuit-switched telephone network who are allocated a dedicated connection, cable modem users do not occupy a fixed amount of bandwidth during their online sessions but instead share the network with other online users, only using network resources when sending and receiving data in quick bursts. Users typically grab what they need from the available bandwidth at the instant they need to upload their packets. Delays in transmitting data packets do not affect data quality. However, for voice packets, delays in transmission degrade voice quality so there is a need to closely time voice packet availability with opportunities for transmission, especially in cable networks.

DOCSIS is an evolving standard which specifies modulation schemes and protocols for exchange of bidirectional signals over cable, allowing version 4 IP traffic to achieve transparent transfer between the Cable Modem Termination System-Network Side Interface (CMTS-NSI) and the Cable Modem to Customer Premise Equipment Interface (CMCI). Voice over IP (VoIP) is a new service capable of being supported by DOCSIS cable networks. Upgrades to existing cable modems and DSPs to maximize VoIP quality can be achieved by changing the programming in their EEPROM flash memory.

SUMMARY OF THE INVENTION

The present invention relates to a method for synchronizing packet availability with the Unsolicited Grant data transfer opportunities in a DOCSIS 1.1 cable. The goal of this synchronization is to ensure that packet transmission delay in a cable modem is minimized by having the voice or data processed, packetized and ready to be transmitted by the cable modem as close to the grant opportunity as possible. This is an important consideration in voice over packet networks in general, and voice over cable networks specifically, due to the impact of delay on voice quality.

The major issue with implementation of packet/grant synchronization is that the module generating packets (digital signal processor or DSP) is typically separate from the module handling the cable data transmission/reception (cable modem). Thus, any synchronization scheme will need to account for latencies as well as minimizing packet wait time in issuing re-synchronization instructions, especially when the different modules reside on different physical hardware and are not running synchronized clocks. This invention describes a mechanism that is largely independent of these latencies, thus facilitating implementation.

Other advantages and features of the invention will be made apparent in connection with the following detailed description.

The present invention synchronizes availability of packets for transmission with the Unsolicited Grant data transfer opportunities in a DOCSIS 1.1 cable.

The present invention obtains a moving average of packet transmission waiting time in a DOCSIS 1.1 cable modem.

The present invention provides an apparatus for re-synchronizing packet transfer between a DSP and a cable modem that samples packet wait times and re-synchs if this time exceeds a presettable tolerance.

The present invention provides an apparatus for re-synchronizing packet transfer between a DSP and a cable modem that reaches a steady state within few sequential re-synchronization requests from a cable modem to the DSP in a DOCSIS 1.1 cable.

An exemplary embodiment of the invention, as described below includes a low pass filter and a device driver that samples the filter output, for a DOCSIS 1.1 cable modem such that the device driver determines average packet waiting time and maximum propagation delay and communicates their difference to the DSP as a re-sync amount. The DSP then re-syncs packet transfer by delaying transmission of the next packet in sequence by the re-sync amount. Thereafter, the DSP sends packets continuously, separated in time by the grant period. The net result is that subsequent packets arrive at the modem just-in-time for transmission over the cable, i.e., within a small time tolerance prior to the unsolicited grant opportunities in a DOCSIS 1.1 cable.

BRIEF DESCRIPTION OF THE DRAWINGS

For a better understanding of the nature of the present invention its features and advantages, the subsequent detailed description is presented in connection with accompanying drawings in which:

Figure 3:
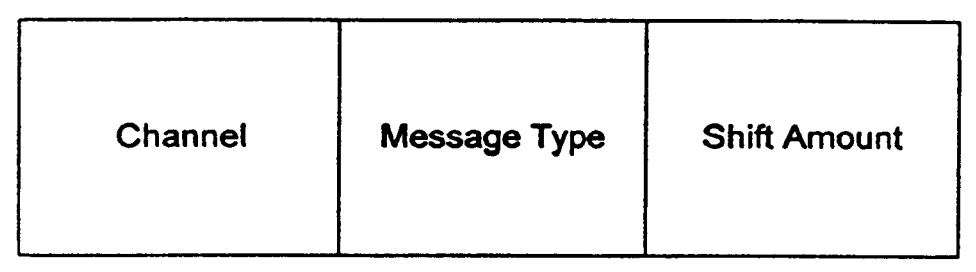

FIG. 3 is an exemplary format for the re-sync message according to the current invention.

DETAILED DESCRIPTION OF PREFERRED EXEMPLARY EMBODIMENTS

Figure 1:
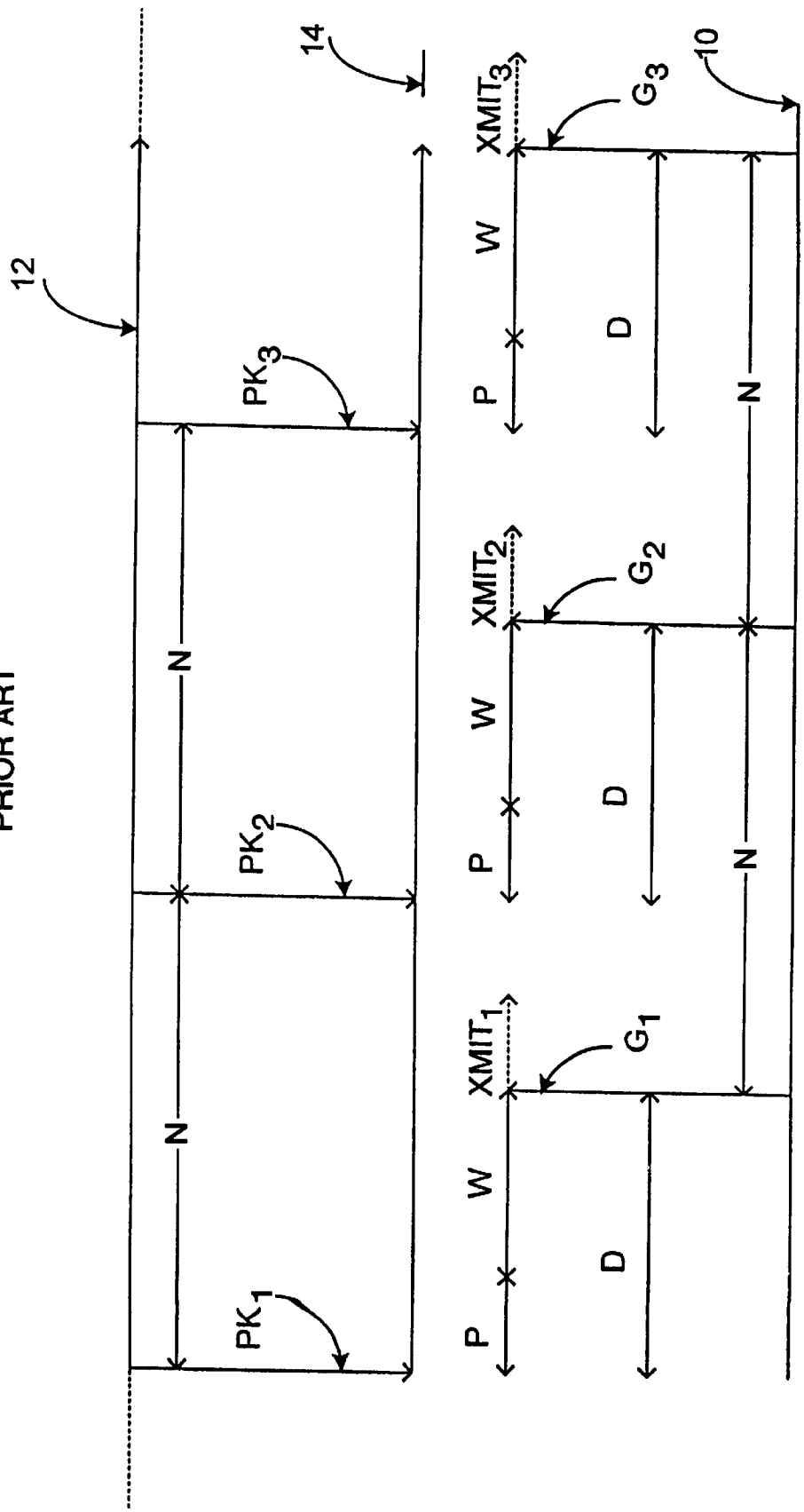
FIG. 1 is a diagram for DSP-to-cable modem packet transmission in a DOCSIS 1.1 cable modem according to the prior art.

As illustrated in FIG. 1, after setup, a DOCSIS cable connection 10 provides unsolicited grant opportunities G spaced at a predetermined interval N. The modem 14 receives packet data PK from DSP 12 and uploads the packet data to the cable at G. The delay D between PK and XMIT comprises the propagation delay P between the DSP and modem and the wait time W in the modem waiting for the next unsolicited grant G. Without re-synching, as in the prior art, D remains constant.

Packet Transmission Delay

Figure 2:
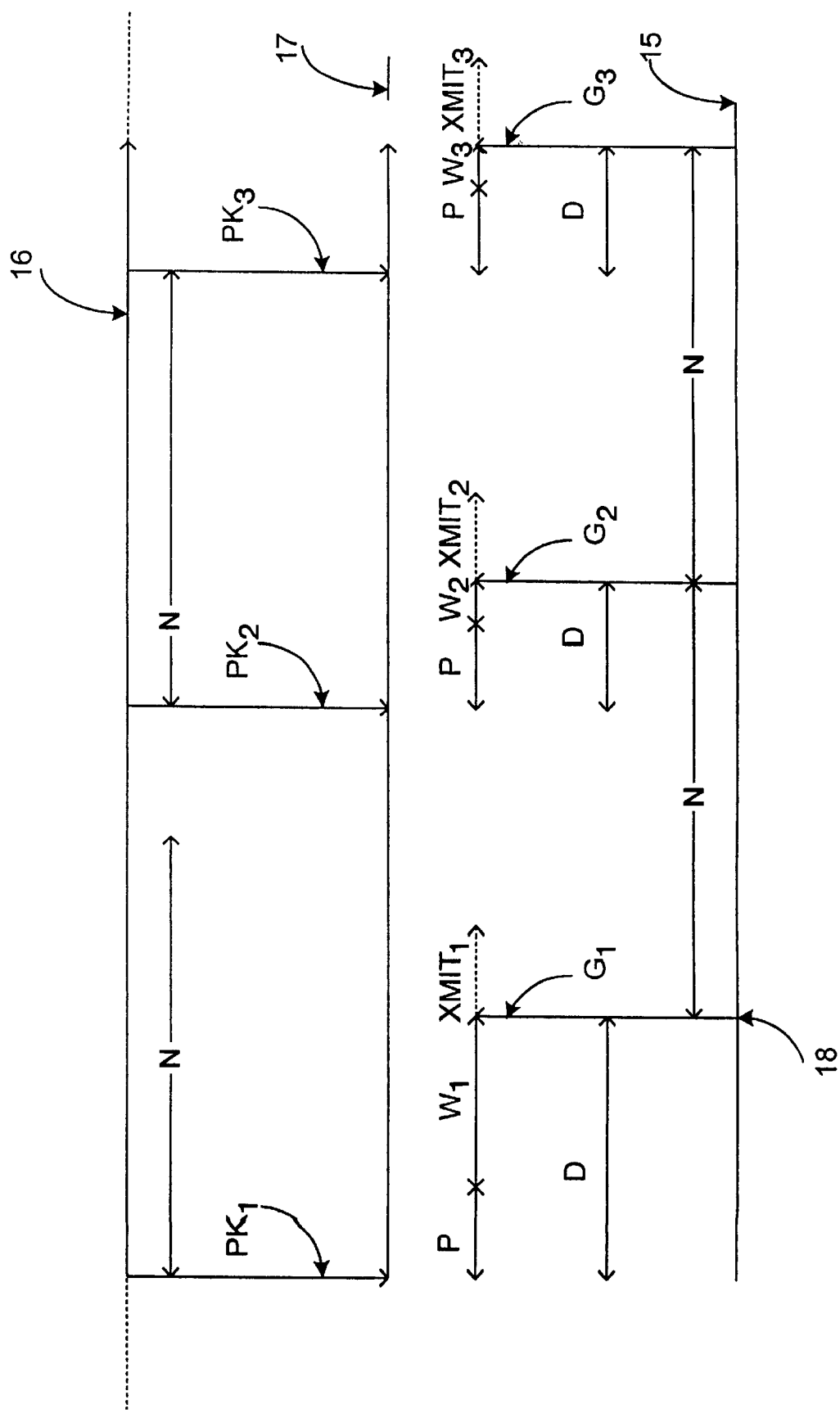
FIG. 2 is a diagram of re-sync which requires only one packetization period, according to the method of the present invention.

The situation in the current invention prior to re-sync is equivalent to that of the prior art and is illustrated in FIG. 1, where the following is assumed:

P=propagation delay or latency, i.e., time it takes for the packet transmission from the DSP to arrive at and process through the cable modem w=time packet waits in the modem's upstream queue before it is transmitted over the cable D=total packet delay time from the time it is transmitted by the DSP until the next grant opportunity, i.e., P+W N=packetization period=grant period T=wait time tolerance for D Re-Sync by DSP Suppose D>T, i.e., the total delay exceeds the preset wait time tolerance. As illustrated in FIG. 2, an exemplary preferred embodiment, to accomplish a re-sync of the situation illustrated in FIG. 1, packet transmission by the DSP 16 to the cable modem 17 of the next packet 18 is delayed by $$W_1 - P = \text{re-sync delay} = \text{SHIFT AMOUNT}$$

A re-sync request 18 is generated by the DSP 17 since the wait time exceeds the preset tolerance, T, such that the next packet can be available for transmission within the desired tolerance of the grant opportunity DOCSIS cable 15. When the packet transmission is shifted, the formation of the packet is also shifted. Because the packet must be of a standard size, this shift necessitates a small loss of the front end or trail end of the shifted packet.

The goal of a re-sync event is to minimize D. The propagation delay (latency), P, cannot be minimized: P varies but has a determinable upper limit, $P_{max}$. Pmax is a configuration parameter and could be determined by measuring the worst case voice packet transfer time from the DSP to the modem with a logic analyzer or similar tools. In a preferred embodiment, a special loopback message could be used between the cable modem and the DSP. The DSP could periodically measure Pmax by timing the round-trip delay to send/receive this message and then dividing by two. This value could then be reported to the cable modem to use as Pmax. Only the packet's waiting time, W, in the upstream queue can be reduced. In the preferred embodiment this is accomplished by shifting to a later time the DSP's transmission of the next packet to the cable modem by:

$$\text{SHIFT AMOUNT} = [\text{AVG}(W) - P_{max}] = \text{WAVE} - P_{max}$$

Ideally, to minimize the potential drop in voice quality, the DSP sends the next packet SHIFT AMOUNT later than normal, so that the next packet arrives at the device driver just-in-time for the unsolicited grant opportunity, i.e., just slightly earlier than the grant opportunity 11. However, it is not critical that this be the case as illustrated below.

Since the DSP continues to continuously send packets separated in time by N, this is a shift backward of SHIFT AMOUNT of all subsequent packets sent by the DSP to the cable modem. While this shift does not result in any loss of data for the subsequent packets, this delay may result in the loss of some information from the stream being sampled by the DSP which should have been included in the next packet. Adding a delay increases the packetization period beyond N for the next packet only. Potentially, this increase results in more data being sampled than can be packaged in a single packet. Some data may have to be discarded.

A few sequential re-synchs may be required before a steady state is achieved, i.e., where packets continue to arrive just prior to the grant opportunity without frequent re-synchs. In the preferred embodiment it is assumed that the DSP is always able to re-sync on the next packet following the one that triggered a re-sync request. This situation is illustrated in FIG. 2 where re-sync is achieved by one DSP re-synch, as directed by the cable modem, because the resultant waiting time is less than T.

In an alternative embodiment the DSP will not always be able to re-sync on the next packet it sends, but will transmit some number of packets in sequence, S, before accomplishing re-synch. In this alternative embodiment a guard gate is employed in the modem to inhibit both re-sync checking and request generation for S packets, to allow the DSP time to re-synch.

Cable Modem and Device Driver

In the preferred embodiment the cable modem includes a low pass filter for producing the moving average of packet waiting times. When the DOCSIS service flow for the voice stream is created, starting the unsolicited grant service, the driver can be provided with a grant-sync function and pointer to a piece of opaque state data or a cookie. When the service flow transmit routine is called, the time is noted and the grant-sync function is called with a PKT—ARR function code along with the cookie, which will be used to store the filter state. After the packet has been transmitted, the cable modem driver notes the time and calls the grant-sync function with a PKT—XMIT function code. Internally, this has the effect of producing the moving average of waiting time, WAVE. One approach to this calculation is to use exponential smoothing; with this technique, the output of the filter, WAVE, is determined as follows:

$$\text{WAVEnew} = a*W + (1-a)*\text{WAVEold};$$

where "a" is the smoothing factor (0<a>1).

"a" would typically be a tunable parameter and would most likely be set so as to limit the impact of short duration oscillations in the waiting time measurement. For example, "a" could be set so that at least K observations of maximal waiting time would need to be observed before WAVE reaches the threshold for reissuing re-sync messages to the DSP.

This filtering object would provide a PKT—DROP function code, so that the cable modem driver can negate observations in the case where the packet was never transmitted. Also, a PKT—INIT function code would allow the cable modem driver to reset the moving average after exceptional conditions, such as loss of cable modem upstream, etc.

DSP/Cable Modem Interface Protocol

Figure 4:
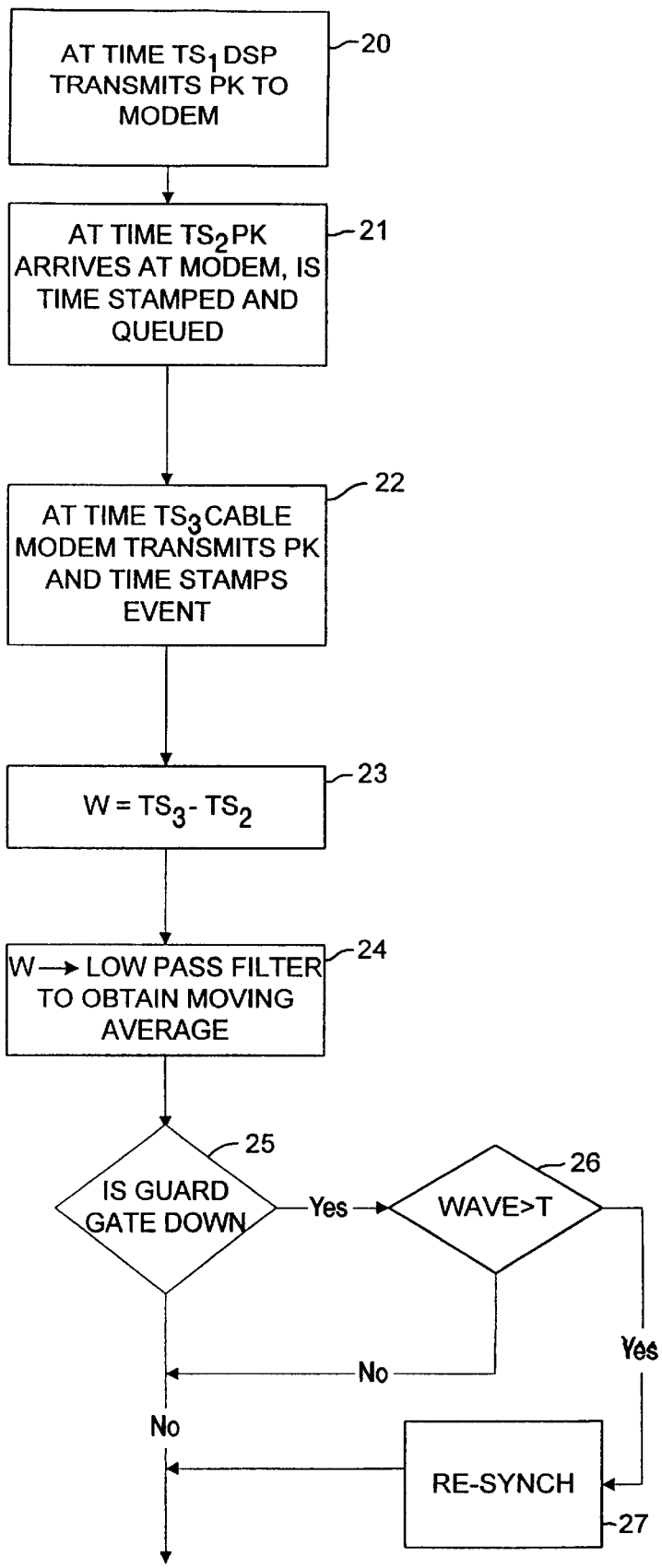
FIG. 4 is an exemplary flow diagram of the process of re-synching according to the preferred embodiment of the current invention.

In the preferred embodiment, the DSP/modem protocol is upgraded to include the following steps, see FIG. 4:

the DSP produces a packet, and transmits the packet to the cable modem 20;

the packet arrives at the cable modem, packet arrival is time stamped, and the packet is placed in an upstream queue the packet is transmitted by the cable modem and packet transmission is time stamped 22;

the cable modem device driver computes the wait time, W, for the packet by computing the difference between its transmission and arrival time stamps 23;

W, the measured waiting time is fed by the device driver to a low pass filter (e.g., moving average) whose output is a measure of the average waiting time, WAVE 24;

WAVE is compared to a threshold or tolerance 25, T, and if WAVE>T a re-sync event takes place 27:
  a re-sync message, format shown in FIG. 3, containing SHIFT AMOUNT is sent to the DSP 26,
  on the next packet the DSP performs re-sync 27, by delaying this packet's formation and transmission to the cable modem by SHIFT AMOUNT.

Re-Sync Message(s)

A simple format for the re-sync message to the DSP is illustrated in FIG. 3. The minimal requirements are:

Channel: a field for identifying the voice channel within the DSP that needs to be re-synchronized.

Message Type: a message type, which will be equal to a constant GTANT—SYNCH, and Shift Amount: the shift amount, in convenient time units such as voice samples, (typically 125 micro seconds)

Re-Re-Synching

Since the DSP employs the grant interval, N, to equally space all packets subsequent to the re-sync event, all future packets sent by the DSP should arrive just-in-time for the grant opportunity. However, there will be some drift subsequent to re-sync events and, very occasionally, re-re-synching will be needed. To accommodate this drift, the average wait time, WAVE, is continually or periodically output, compared to a wait time tolerance T, and when and if WAVE>T another re-sync event takes place. Thereafter, subject to drift, the packets will once again arrive within tolerance T of the grant interval, i.e., just-in-time to be transmitted by the cable modem.

Guard Gate

In an alternative embodiment, the cable modem may not send the re-sync message in real time and/or the DSP may not adjust immediately on receiving a re-sync message with the result that there will be several packets in a row arriving at the cable modem which would trigger additional re-sync events. To guard against sending a sequence of two or more identical re-sync messages to the DSP, once a re-sync event has been triggered, the cable modem must wait several packets, i.e., S, before again checking WAVE against T. In an alternative embodiment, this is realized as a guard gate 30.

As a person skilled in the art will realize, numerous other modifications to the DSP/Cable Modem interface can be made to accomplish the current invention. Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for synchronizing packet production and receipt from a packetization module such as a digital signal processor (DSP) with unsolicited grant transmission opportunities in a cable modem, said method comprising:
   producing a packet by a DSP;
   transmitting said packet from said DSP to cable modem; and
   receiving said packet by said cable modem;
   time stamping the arrival of said packet at said cable modem; and
   transmitting said packet by said cable modem, wherein said packet transmission from said DSP to said cable modem is synchronized with said cable modem's next unsolicited transmission grant opportunity.

2. A method according to claim 1, wherein said method further comprises determination of the average waiting time of said packet in said cable modem by:
   time stamping said transmission of said packet by said cable modem; and
   computing the wait time of said packet in said cable modem as the difference between said arrival time stamp and said transmission time stamp.

3. A method according to claim 2, further comprising the step of:
   obtaining a moving average of said wait times up to the current time.

4. A method according to claim 3, wherein said method further comprises:
   determining a re-sync value based on said computed wait time;
   comparing said re-sync value to a re-sync value range;
   transmitting said re-sync value to said DSP whenever said re-sync value is outside said re-sync value range.

5. A method according to claim 4, wherein said DSP further comprises:
   redefining transmission slots for said packets to said modem in response to said re-sync amount transmitted from said modem;
   using said redefined slots to time the DSP'S production and transmission of said packet to the cable modem.

6. A method according to claim 1, wherein:
   transmitting said packets by said cable modem includes continuously monitoring said packets, at least some of said continuously transmitted packets generating a re-sync request to said DSP;
   transmitting of said packet continuously by the cable modem is according to predefined, fixed period, unsolicited grant opportunities;
   producing said packets continuously by the DSP in fixed time slots until new slot timer information is transmitted in a re-sync request to said DSP by said cable modem.

7. A method according to claim 6, wherein said method further comprises:
   analyzing timing of said packet arrivals relative to timing of said grant opportunities at said cable modem, and responsively identifying the need for new slot timer information; and
   transmitting said re-sync request to said DSP includes calculating said new slot timer information at the cable modem.

8. An apparatus for synchronizing packets from a packetization module with unsolicited grant transmission opportunities in a cable modem, comprising:
   a digital signal processor for producing packetized data in fixed times slots and for transmitting said packets to a cable modem;
   a cable modem for receiving said packets and for transmitting said packets at unsolicited grant opportunities;
   comparater logic for determining a wait time between an arrival of said packets at said cable modem and said unsolicited grant opportunities; and
   adjustment logic for adjusting the production and transmission of packets by said DSP in accordance with said determined wait time.

9. An apparatus according to claim 8, wherein said production adjustment comprises:
   means for redefining packet production time to minimize said determined wait time to produce packets for receipt by the cable modem just in time for transmission grant opportunities.

* * * * *